United States Patent [19]

Muzik

[11] Patent Number: 4,706,414

[45] Date of Patent: Nov. 17, 1987

[54] APPARATUS FOR ROTATABLY SUPPORTING A MARINE PROPELLER IN A VIBRATING MEDIA

[75] Inventor: Gregory A. Muzik, Shawano, Wis.

[73] Assignee: Outboard Marine Corporation, Waukegan, Ill.

[21] Appl. No.: 737,933

[22] Filed: May 28, 1985

[51] Int. Cl.[4] ............................................. B24B 19/00
[52] U.S. Cl. ............................................. 51/7; 51/19; 51/163.1; 403/370
[58] Field of Search ................. 51/6, 7, 17, 19, 216 T, 51/217 T, 226, 227 R, 237 R, 163.1; 269/48.1; 279/2 R; 403/368-370

[56] References Cited

U.S. PATENT DOCUMENTS

| | | | |
|---|---|---|---|
| 2,542,967 | 2/1951 | Waechter | 279/2 |
| 3,371,449 | 3/1969 | Olson et al. | 51/7 |
| 3,464,163 | 9/1965 | Ferrara | 51/7 |
| 3,576,336 | 4/1971 | Uhlig | 279/2 |
| 3,611,638 | 10/1971 | Deede | 51/7 |
| 4,096,666 | 6/1978 | Brown | 51/7 |
| 4,173,851 | 11/1979 | Higashi | 51/7 |
| 4,205,487 | 6/1980 | Anderson et al. | 51/7 |
| 4,524,550 | 6/1985 | Burke et al. | 51/424 |

Primary Examiner—Frederick R. Schmidt
Assistant Examiner—Bradley I. Vaught
Attorney, Agent, or Firm—Michael, Best & Friedrich

[57] ABSTRACT

An apparatus adapted to rotatably support a propeller in a vibrating media, the propeller including a tubular hub having an annular end surface, the apparatus comprising a mounting bracket, a hub member rotatably mounted on the mounting bracket for rotation relative to the mounting bracket about an axis and including an annular surface perpendicular to and centered on the hub member axis, and a clamping device releasably and fixedly connecting the propeller hub to the hub member with the annular end surface of the propeller hub engaging the annular surface of the hub member for enabling rotation of the propeller with the hub member relative to the mounting bracket.

26 Claims, 7 Drawing Figures

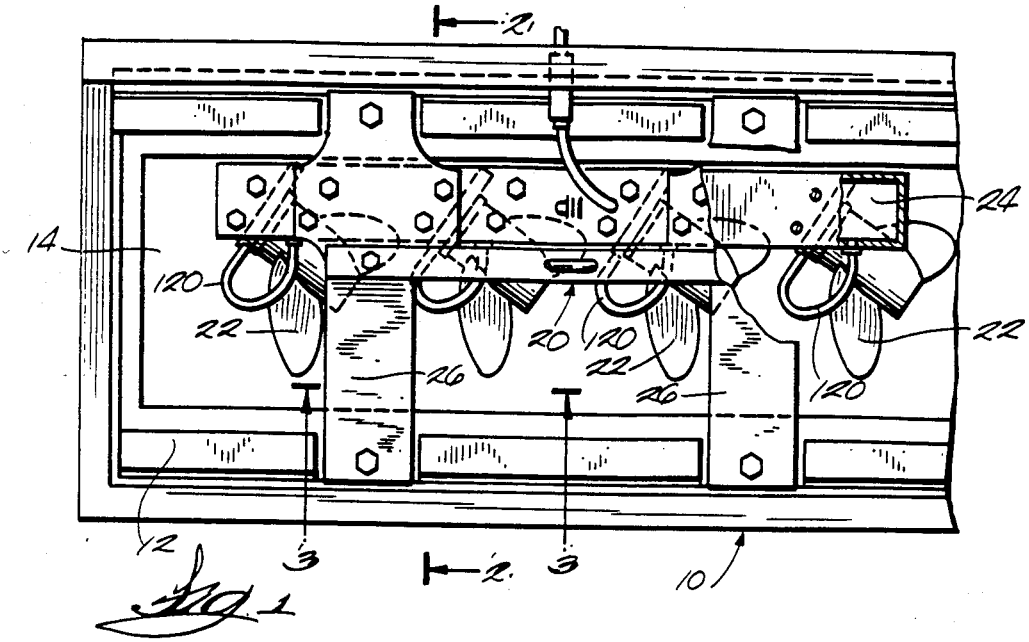
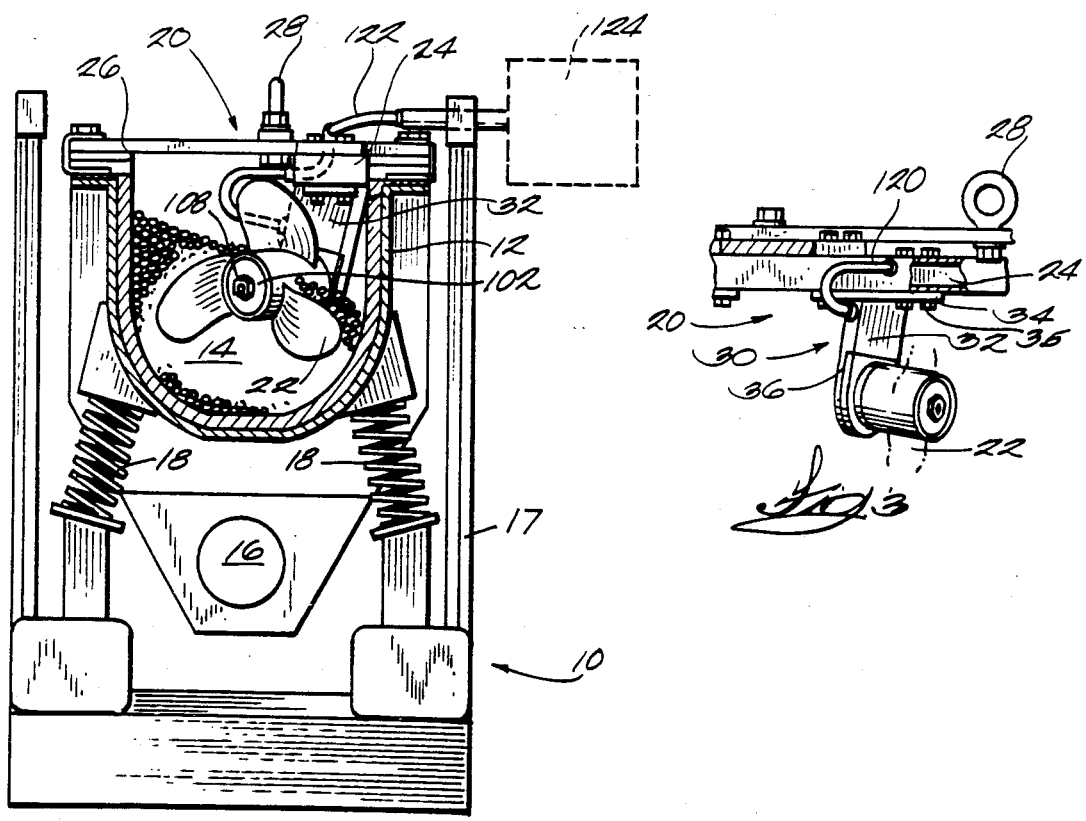

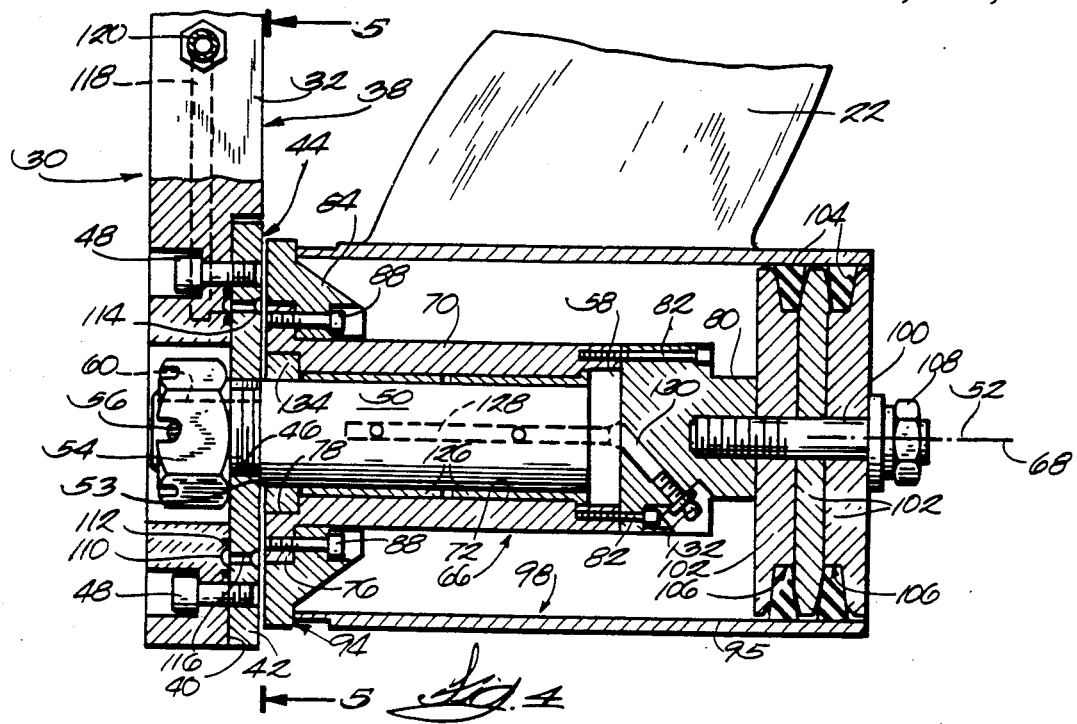

APPARATUS FOR ROTATABLY SUPPORTING A MARINE PROPELLER IN A VIBRATING MEDIA

BACKGROUND OF THE INVENTION

The invention relates to apparatus for finishing articles in a vibrating media, and more particularly to apparatus for rotatably supporting a marine propeller in a vibrating media.

It is known in the art to rotatably support a marine propeller in a vibrating media. Known methods for doing this include mounting a propeller on a fixed axle for rotation relative to the axle in a vibrating media, and mounting a propeller on a rotating axle for rotation with the axle relative to a mounting member in a vibrating media. One problem associated with these methods is binding and stopping of the propeller when the media flows between relatively moving parts. Another problem associated with these methods is oscillation of the propeller against the axle and/or the mounting member, causing work hardening and mushrooming of mating surfaces.

Attention is directed to the following U.S. Pat. Nos. which disclose finishing apparatus:

Anderson pat No. 4,205,487, issued Jun. 3, 1980; Higashi 4,173,851, issued Nov. 13, 1979; Brown 4,096,666, issued Jun. 27, 1978; Deede 3,611,638, issued Oct. 12, 1971; Ferrara 3,464,163, issued Sep. 2, 1969; and Olson 3,371,449, issued Mar. 5, 1968.

SUMMARY OF THE INVENTION

The invention provides an apparatus adapted to rotatably support a propeller in a vibrating media, the propeller including a tubular hub having an annular end surface, the apparatus comprising a mounting bracket, a hub member rotatably mounted on the mounting bracket for rotation relative to the mounting bracket about an axis and including an annular surface perpendicular to and centered on the hub member axis, and means releasably and fixedly connecting the propeller hub to the hub member with the annular end surface of the propeller hub engaging the annular surface of the hub member for enabling rotation of the propeller with the hub member relative to the mounting bracket.

The invention also provides an apparatus adapted to rotatably support a propeller including a tubular hub in a vibrating media, the apparatus comprising a mounting bracket including a generally planar surface, a hub member rotatably mounted on the mounting bracket for rotation relative to the mounting bracket about an axis and including a generally planar surface adjacent the mounting bracket surface, means releasably and fixedly connecting the propeller hub to the hub member for enabling rotation of the propeller with the hub member relative to the mounting bracket, and means for providing an air current between the mounting bracket surface and the hub member surface.

In one embodiment, the mounting bracket surface includes an annular groove, and the means for providing an air current includes an air passage in the mounting bracket communicating with the groove.

In one embodiment, the apparatus further comprises an axle member fixedly connected to the mounting bracket and having a longitudinal axis generally colinear with the hub member axis, and the hub member includes an inner surface defining a generally cylindrical bore receiving the axle member such that hub member rotates about the axle member.

In one embodiment, the apparatus further comprises a bushing located in the cylindrical bore between the hub member inner surface and the axle member.

In one embodiment, the axle member has an outer surface, and the apparatus further comprises means for supplying a lubricant to the outer surface of the axle member.

In one embodiment, the apparatus further comprises sealing means between the inner surface of the hub member and the outer surface of the axle member adjacent the mounting bracket.

In one embodiment, the apparatus further comprises slot and key means operative between the axle member and the mounting bracket for preventing rotation of the axle member relative to the mounting bracket.

In one embodiment, the propeller hub has an inner surface, and the means for connecting the propeller hub to the hub member includes means on the hub member for engaging the inner surface of the propeller hub.

In one embodiment, the propeller hub inner surface has an inner diameter, and the engaging means includes a resilient member having a relaxed outer periphery of lesser diameter than the inner diameter of the propeller hub inner surface, and means for deforming the resilient member to engage the propeller hub inner surface.

In one embodiment, the propeller hub inner surface has an inner diameter, the hub member has an end opposite the mounting bracket, and the engaging means includes a projection extending from the second end of the hub member along the hub member axis, a pair of discs having diameters slightly less than the inner diameter of the propeller hub and including central apertures slidably receiving the projection, and radially outer portions including outer edges, an annular, resilient, flexible member positioned between the outer portions of the discs, and means for squeezing the discs together to cause the flexible member to extend beyond the outer edges of the discs to engage the inner surface of the propeller hub.

In one embodiment, the projection is externally threaded, and the squeezing means includes a nut threaded onto the projection.

In one embodiment, the hub member further includes a generally cylindrical main portion including the cylindrical bore, a first end corresponding to the first end of the hub member and including an end surface adjacent the mounting bracket surface, and an opposite second end corresponding to the second end of the hub member, a hub cap mounted on the second end of the main portion and including the projection, and a hub stop mounted on the first end of the main portion and including the hub member annular surface, a generally cylindrical bore receiving the first end of the main portion, and an end surface adjacent the mounting bracket surface and combining with the main portion end surface to form the hub member generally planar surface.

A principal feature of the invention is the provision of an apparatus comprising a hub member including an annular surface perpendicular to and centered on the hub member axis, and means releasably and fixedly connecting a propeller hub to the hub member with the annular end surface of the propeller hub engaging the annular surface of the hub member for enabling propeller rotation with the hub member. Because the end surface of the propeller hub engages the annular surface of the hub member, oscillation of the propeller hub against the hub member is substantially prevented. Also, the vibrating media is substantially prevented from flowing inside the propeller hub between the end surface of the propeller hub and the hub member.

Another principal feature of the invention is the provision of an apparatus comprising a mounting bracket, a hub member rotably mounted on the mounting bracket, and means for providing an air current between the mounting bracket and the hub member. The air current substantially prevents the vibrating media from flowing between the mounting bracket and the hub member. This both prevents binding of the mounting bracket and the hub member and keeps the vibrating media away from rubber parts, such as seals, located inside the hub member.

Other principal features and advantages of the invention will become apparent to those skilled in the art upon review of the following detailed description, claims, and drawings.

DESCRIPTION OF THE DRAWINGS

FIG. 1 is a partial top view of a finishing apparatus embodying the invention.

FIG. 2 is a cross sectional view taken along line 2—2 in FIG. 1.

FIG. 3 is a cross sectional view taken along line 3—3 of FIG. 1.

FIG. 4 is an enlarged cross sectional view of one of the axle assemblies of the apparatus.

FIG. 5 is a cross sectional view taken along line 5—5 in FIG. 4.

FIG. 6 is a partial cross sectional view of the axle assembly shown in FIG. 4 with the propeller removed.

FIG. 7 is an enlarged cross sectional view showing a portion of FIG. 4.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A finishing machine 10 embodying the invention is illustrated in the drawings. As best shown in FIG. 2, the machine 10 includes a tub 12 adapted to contain a finishing media 14. Fixedly connected to the tub 12 is a vibrator 16 for causing vibration of the tub 12. The tub 12 and the vibrator 16 are movably supported on a frame 17 by springs 18.

The machine 10 also includes an apparatus 20 adapted to be mounted on the tub 12 and to rotatably support a plurality of marine propellers 22 in the vibrating media 14. The apparatus 20 is shown mounted on the tub 12 in FIGS. 1 and 2. As best shown in FIG. 1, the apparatus 20 comprises an elongated member 24 extending in the direction of the length of the tub 12, and a pair of cross members 26 fixedly connected to the elongated member 24 and extending across the tub 12 and mounted on the opposite sides of the tub 12. The apparatus 20 also comprises a ring 28 (FIGS. 2 and 3) fixedly connected to the cross members 26 and engageable by lifting means (not shown) for raising and lowering the apparatus 20 relative to the tub 12.

The apparatus 20 also comprises a plurality of axle assemblies 30 mounted on the elongated member 24 for rotatably supporting the propellers 22. The axle assemblies 30 are substantially identical, and only one will be described in detail.

As best shown in FIGS. 3 through 5, the axle assembly 30 includes a mounting bracket 32 fixedly connected to the elongated member 24. The mounting bracket 32 includes (see FIG. 3) a generally horizontal portion 34 connected to the elongated member 24 by a plurality of bolts 35, and a generally vertical portion 36 extending downwardly from the horizontal portion 34. Preferably, as best shown in FIGS. 2 and 3, the vertical portion 36 extends at an angle of approximately 16° from vertical. The mounting bracket 32 also includes a front surface 38, a recessed area 40 (FIG. 4) at the lower end of the vertical portion 36, and a wear plate 42 (FIGS. 4 and 5) mounted in the recessed area 40 and having an outer surface 44 which is substantially flush with the front surface 38. The wear plate 42 has therein a bore 46 and is preferably mounted on the main portion of the mounting bracket 32 by a plurality of bolts 48. In the preferred embodiment, the wear plate 42 is made of heat treated steel.

The axle assembly 30 also includes an axle member 50 (FIG. 4) fixedly connected to the wear plate 42 and having a generally horizontal longitudinal axis 52. In the illustrated construction, the left end (as viewed in FIG. 4) of the axle member 50 includes a shoulder 53 and an externally threaded portion extending through the bore 46 in the wear plate 42. The axle member 50 is secured to the wear plate 42 by a nut 54 threaded onto the externally threaded portion of the axle member 50 so that the wear plate 42 is secured between the shoulder 53 and the nut 54. The nut 54 is secured in position by a cotter pin 56 extending through the end of the axle member 50. The right end (as viewed in FIG. 4) of the axle member 50 includes a head 58 having a diameter slightly larger than the diameter of the remainder of the axle member 50.

Preferably, the axle assembly 30 further includes slot and key means operative between the axle member 50 and the wear plate 42 for preventing rotation of the axle member 50 relative to the wear plate 42 or mounting bracket 32. In the illustrated construction, the slot and key means includes a slot 60 (FIGS. 4 and 5) in the left end of the axle member 50, an aligned slot 62 (FIG. 5) in the wear plate 42, and a key 64 received in the two slots 60 and 62.

The axle assembly 30 further includes a hub member 66 (FIG. 4) rotatably mounted on the axle member 50 for rotation relative to the axle member 50 and to the mounting bracket 32 about a hub member axis 68 generally colinear with the axle member axis 52. In the illustrated construction, the hub member 66 includes a generally cylindrical main portion 70 including an inner surface defining a generally cylindrical bore 72. The bore 72 receives the axle member 50 such that the hub member main portion 70 rotates relative to the axle member 50 and to the mounting bracket 32 about the axle member 50. The main portion 70 has a left end (as viewed in FIG. 4) including an end surface 74 (FIG. 7) adjacent the wear plate outer surface 44, an annular, radially outwardly extending flange 76 (FIGS. 4 and 7), and an annular groove 78 (FIG. 4) communicating with the bore 72. The hub member 66 also includes a hub cap 80 mounted on the right end of the main portion 70 so as to rotate with the main portion 70 relative to the axle member 50. In the illustrated construction, the hub cap 80 is mounted on the main portion 70 by a plurality of bolts 82.

The hub member 66 further includes an annular hub stop 84 (FIGS. 4 and 7) mounted on the left end of the main portion 70. In the illustrated construction, the hub stop 84 is connected to the main portion 70 by a plurality of bolts 88 (FIG. 4) threaded into the annular flange 76 of the main portion 70. The hub stop 84 further includes an end surface 90 (FIG. 7) adjacent the wear plate outer surface 44 and combining with the main portion end surface 74 to form a generally planar hub member surface adjacent the wear plate outer surface 44. The hub stop 84 also includes an annular surface 94 perpendicular to the hub member axis 68 and facing away from the mounting bracket 32.

The axle assembly 30 is adapted to support a propeller 22 as shown in the drawings. As best shown in FIG. 4, the propeller 22 has a tubular hub 95 having an annular end surface 96 (FIG. 6) and an inner surface 98 (FIG. 4).

The axle assembly 30 also includes means for releasably and fixedly connecting the propeller hub 95 to the hub member 66 with the annular end surface 96 of the propeller hub 95 engaging the annular surface 94 of the hub stop 84 for enabling propeller rotation with the hub member 66 relative to the mounting bracket 32. Preferably, the means for connecting the propeller hub 95 to the hub member 66 include means on the hub member 66 for engaging the inner surface 98 of the propeller hub 95. While various suitable connecting means can be employed, in the illustrated construction, the connecting means includes a resilient member or members 104 having a relaxed outer periphery of lesser diameter than the inner diameter of the propeller hub inner surface 98, and means for deforming the resilient members 104 to engage the propeller hub inner surface 98.

More particularly, in the preferred embodiment, the connecting means includes an externally threaded stud 100 (FIGS. 4 and 6) extending from the hub cap 80 along the hub member axis 68, and three discs 102 slidably mounted on the stud 100. In the illustrated construction, the discs 102 have central apertures slidably receiving the stud 100. The discs 102 also have diameters less than the inner diameter of the propeller hub inner surface 98, and radially outer portions including outer edges. The connecting means preferably also includes a pair of annular, resilient, flexible members 104 (preferably vulcanized rubber) positioned between the outer portions of the adjacent pairs of discs 102, and means for squeezing together the discs 102 to cause the flexible members 104 to extend beyond the outer edges of the discs 102 to engage the inner surface 98 of the propeller hub 95. In the preferred embodiment, the two outer discs 102 include annular shoulders 106 on which the flexible members 104 are mounted, and the squeezing means includes a nut 108 threaded onto the outer end of the stud 100. The connecting means is shown with the discs 102 spaced apart in FIG. 6, and with the discs 102 squeezed together in FIG. 4.

The axle assembly 30 further includes means for providing an air current between the wear plate outer surface 44 and the hub member surface formed by the main portion end surface 74 and the hub stop end surface 90. In the illustrated construction, the mounting bracket 32 includes an annular groove 110 (FIG. 4) in the recessed area 40, and a pair of O-rings 112 sealing the annular groove 110. The wear plate 42 includes an annular groove 114 in the wear plate outer surface 44, and a plurality of apertures 116 extending through the wear plate 42 and communicating between the two annular grooves 110 and 114. This is best shown in FIGS. 4 and 5.

While various suitable means for providing an air current can be used, in the preferred embodiment, this means includes an air passage 118 in the mounting bracket 32 having one end communicating with the annular groove 110, and another end communicating with a flexible conduit 120 which in turn communicates with a suitable air supply system 122 (shown schematically in FIG. 2) for feeding compressed air to all of the mounting brackets 32. The air supply system 122 includes a suitable source of compressed air 124 (shown schematically in FIG. 2). In the preferred embodiment, the source of compressed air 124 provides air at approximately 30 psi.

The compressed air flowing out of the mounting bracket 32 through the openings 116 and the annular groove 114 in the wear plate 42 causes a constant flow of air radially outwardly from between the hub member 66 and the wear plate 42. This flow of air prevents the media 14 from flowing between the mounting bracket 32 and the hub member 66.

In the preferred embodiment, the axle assembly 30 further includes a pair of bushings 126 (FIG. 4) located in the cylindrical bore 72 between the inner surface of the hub member main portion 70 and the axle member 50. Also, in the preferred embodiment, the axle assembly 30 further includes means for supplying a lubricant to the outer surface of the axle member 50. While various suitable lubricant-supplying means can be used, in the illustrated construction, this means includes a passage 128 in the axle member 50 having branches communicating with the outer surface of the axle member 50 and communicating with an opening in the right end of the axle member 50. The lubricating means further includes a passage 130 in the hub cap 80 communicating with the opening in the axle member 50, and a grease fitting 132 removably sealing the hub cap passage 130.

In the preferred embodiment, the axle assembly 30 further includes sealing means between the inner surface of the hub member main portion 70 and the outer surface of the axle member 50 adjacent the mounting bracket 32. While various suitable sealing means can be employed, in the illustrated construction, the sealing means includes an annular rubber seal 134 (FIGS. 4 and 7) received in the annular groove 78 between the hub member main portion 70 and the axle member 50. The rubber seal 134 keeps the lubricant inside the hub member 66 and keeps the media 14 out of the inside of the hub member 66.

The apparatus 20 operates as follows: With the circular discs 102 spaced apart as shown in FIG. 6, the propeller hub 95 is placed onto the axle assembly 50 with the annular end surface 96 of the propeller hub 95 tightly engaging the annular surface 94 of the hub stop 84. Next, the nut 108 is tightened to squeeze the discs 102 together so that the flexible members 104 engage the inner surface 98 of the propeller hub 95 and secure the propeller hub 95 to the axle assembly 50. Next, the apparatus 30 is lowered onto the tub 12 so that the axle assemblies 50 are at least partially submerged in the media 14, while the source of compressed air 124 is actuated to provide the air current flowing out from between the hub member 66 and the mounting bracket 32. Also, the vibrator 16 is actuated to cause vibration of the media 14 in the tub 12 and subsequent rotation of the propeller 22 and hub member 66 relative to the mounting bracket 32.

Various other features and advantages of the invention are set forth in the following claims.

I claim:

1. An apparatus adapted to rotatably support a work piece in a vibrating media, the work piece including a tubular hub having an annular end surface, said apparatus comprising a mounting bracket, a hub member rotatably mounted on said mounting bracket for rotation relative to said mounting bracket about an axis and including an unsupported end, and means on said hub member end and movable relative to said hub member for releasably connecting said hub member with the annular end surface of the work piece hub for enabling rotation of the work piece with said hub member relative to said mounting bracket.

2. An apparatus as set forth in claim 1 wherein said mounting bracket includes a generally planar surface, wherein said hub member includes a generally planar surface adjacent said mounting bracket surface, and wherein said apparatus further comprises means for providing an air current between said surfaces.

3. An apparatus as set forth in claim 2 wherein said mounting bracket surface includes an annular groove, and wherein said means for providing an air current includes an air passage in said mounting bracket communicating with said groove.

4. An apparatus adapted to rotatably support a propeller in a vibrating media, the propeller including a tubular hub having an annular end surface, said appartus comprising a mounting bracket, an axle member fixedly connected to said mounting bracket and having a longitudinal axis, a hub member rotatably mounted on said mounting bracket for rotation relative to said mounting bracket about an axis colinear with said axle member axis and including an unsupported end, an inner surface defining a generally cylindrical bore receiving said axle member such that hub member rotates about said axle member, and means for releasably connecting said end of said hub member with the annular end surface of the propeller hub for enabling rotation of the propeller with said hub member relative to said mounting bracket.

5. An apparatus as set forth in claim 4 and further comprising a bushing located in said cylindrical bore between said hub member inner surface and said axle member.

6. An apparatus as set forth in claim 4 wherein said axle member has an outer surface, and wherein said apparatus further comprises means for supplying a lubricant to said outer surface of said axle member.

7. An apparatus as set forth in claim 6 and further comprising sealing means between said inner surface of said hub member and said outer surface of said axle member adjacent said mounting bracket.

8. An apparatus as set forth in claim 4 and further comprising slot and key means operative between said axle member and said mounting bracket for preventing rotation of said axle member relative to said mounting bracket.

9. An apparatus as set forth in claim 1 wherein the work piece hub has an inner surface, and wherein said means for connecting the work piece hub to said hub member includes means on said hub member for engaging the inner surface of the work piece hub.

10. An apparatus as set forth in claim 9 wherein the work piece hub inner surface has an inner diameter, and wherein said engaging means includes a resilient member having a relaxed outer periphery of lesser diameter than the inner diameter of the work piece hub inner surface, and means for deforming said resilient member to enage the inner surface of the work piece hub.

11. An apparatus as set forth in claim 9 wherein the hub inner surface has an inner diameter, and wherein said engaging means includes a projection extending from said end of said hub member along said hub member axis, a pair of discs having diameters slightly less than the inner diameter of the propeller hub inner surface and including central apertures slidably receiving said projection, and radially outer portions including outer edges, an annular, resilient, flexible member positioned between said outer portions of said discs, and means for squeezing said discs together to cause said flexible member to extend beyond said outer edges of said discs to engage the inner surface of the propeller hub.

12. An apparatus as set forth in claim 11 wherein said projection is externally threaded, and wherein said squeezing means includes a nut threaded onto said projection.

13. An apparatus adapted to rotatably support a work piece including a tubular hub in a vibrating media, said apparatus comprising a mounting bracket including a generally planar surface, a hub member rotatably mounted on said mounting bracket for rotation relative to said mounting bracket about an axis and including a genrally planar surface adjacent said mounting bracket surface, maens on said hub member and movable relative to said hub member for releasably connecting the propeller hub to said hub member so as to enable rotation of the work piece with said hub member relative to said mounting bracket, and means for providing an air current between said mounting bracket surface and said hub member surface.

14. An apparatus as set forth in claim 13 wherein said mounting bracket surface includes an annular groove, and wherein said means for providing an air current includes an air passage in said mounting bracket communicating with said groove.

15. An apparatus adapted to rotatably support a propeller including a tubular hub with an annular end surface in a vibrating media, said apparatus comprising a mounting bracket including a generally planar surface, a hub member rotatably mounted on said mounting bracket for rotation relative to said mounting bracket about an axis and including a genearlly planar surface adjacent said mounting bracket surface and, an annular surface perpendicular to and centered on said hub member axis, means on said hub member for releasably connecting the propeller hub to said hub member so as to enable rotation of the propeller with said hub member relative to said mounting bracket and so as to engage the propellar hub annular end surface with said hub member annular surface, and means for providing an air current between said mounting bracket surface and said hub member surface.

16. An apparatus adapted to rotatably support a propeller including a tubular hub in a vibrating media, said apparatus comprising a mounting bracket including a generally planar surface, an axle member fixedly connected to said mounting bracket and having a longitudinal axis, a hub member rotatably mounted on said mounting bracket for rotation relative to said mounting bracket about an axis generally coinciding with said axle and including a generally planar surface adjacent said mounting bracket surface, said hub member also including an inner surface defining a generally cylindrical bore receiving said axle member such that hub member rotates about said axle member, means on said hub member for releasably connecting the propeller hub to said hub member so as to enable rotation of the propeller with said hub member relative to said mounting bracket, and means for providing an air current between said mounting bracket surface and said hub member surface.

17. An apparatus as set forth in claim 16 and further comprising a bushing located in said cylindrical bore between said hub member inner surface and said axle member.

18. An apparatus as set forth in claim 16 wherein said axle member has an outer surface, and wherein said apparatus further comprises means for supplying a lubricant to said outer surface of said axle member.

19. An apparatus as set forth in claim 18 and further comprising sealing means between said inner surface of said hub member and said outer surface of said axle member adjacent said mounting bracket.

20. An apparatus as set forth in claim 16 and further comprising slot and key means operative between said axle member and said mounting bracket for preventing rotation of said axle member relative to said mounting bracket.

21. An apparatus as set forth in claim 13 wherein the work piece hub has an inner surface, and wherein said means for connecting the work piece hub to said hub member includes means on said hub member for engaging the inner surface of the work piece hub.

22. An apparatus as set forth in claim 21 wherein the work piece hub inner surface has an inner diameter, and wherein said engaging means includes a resilient member having a relaxed outer periphery of lesser diameter than the inner diameter of the work piece hub inner surface, and means for deforming said resilient member to engage the inner surface of the work piece hub.

23. An apparatus as set forth in claim 21 wherein the work piece hub inner surface has an inner diameter, wherein said hub member has an end opposite said mounting bracket, and wherein said engaging means includes a projection extending from said second end of said hub member along said hub member axis, a pair of discs having diameters slightly less than the inner diameter of the work piece hub inner surface and including central apertures slidably receiving said projection, and radially outer portions including outer edges, an annular, resilient, flexible member positioned between said outer portions of said discs, and means for squeezing said discs together to cause said flexible member to extend beyond said outer edges of said discs to engage the inner surface of the work piece hub.

24. An apparatus as set forth in claim 23 wherein said projection is externally threaded, and wherein said squeezing means includes a nut threaded onto said projection.

25. An apparatus adapted to rotatably support a propeller in a vibrating media, the propeller including a tubular hub having an annular end surface, and an inner surface with an inner diameter, said apparatus comprising a mounting bracket including a generally planar surface having an annular groove, an axle member fixedly connected to said mounting bracket and having a longitudinal axis and an outer surface, slot and key means operative between said axle member and said mounting bracket for preventing rotation of said axle member relative to said mounting bracket, a hub member including a first end having a generally planar surface adjacent said mounting bracket surface, a second opposite end, an inner surface defining a generally cylindrical bore receiving said axle member such that said hub member rotates relative to said mounting bracket about said axle member, and an annular surface perpendicular to and centered on said axle member axis, means releasably and fixedly connecting the propeller hub to said hub member with the annular end surface of the propeller hub engaging said annular surface of said hub member for enabling rotation of the propeller with said hub member relative to said mounting bracket, said connecting means including an externally threaded projection extending from said second end of said hub member along said axle member axis, a pair of discs having diameters slightly less than the inner diameter of the propeller hub inner surface and including central apertures slidably receiving said projection, and radially outer portions including outer edges, an annular, resilient, flexible member positioned between said outer portions of said discs, and a nut threaded onto said projection for squeezing together said discs between said nut and said second end of said hub member to cause said flexible member to extend beyond said outer edges of said discs and to engage the inner surface of the propeller hub, sealing means between said hub member inner surface and said axle member outer surface adjacent said mounting bracket, means for providing an air current between said hub member planar surface and said mounting bracket planar surface and including an air passage in said mounting bracket communicating with said groove in said mounting bracket, a bushing located in said cylindrical bore between said hub member inner surface and said axle member outer surface and, means for supplying a lubricant to said outer surface of said axle member.

26. An apparatus as set forth in claim 25 wherein said hub member further includes a generally cylindrical main portion including said cylindrical bore, a first end corresponding to said first end of said hub member and including an end surface adjacent said mounting bracket surface, and an opposite second end corresponding to said second end of said hub member, a hub cap mounted on said second end of said main portion and including said projection, and a hub stop mounted on said first end of said main portion and including said hub member annular surface, a generally cylindrical bore receiving said first end of said main portion, and an end surface adjacent said mounting bracket surface and combining with said main portion end surface to form said hub member generally planar surface.

* * * * *